CROSSBAR TANDEM OFFICE FOR TELEPHONE SYSTEMS

Filed Nov. 17, 1948 6 Sheets-Sheet 1

INVENTOR
J. B. NEWSOM
BY J. W. Schmied
ATTORNEY

July 3, 1951 J. B. NEWSOM 2,559,312

CROSSBAR TANDEM OFFICE FOR TELEPHONE SYSTEMS

Filed Nov. 17, 1948 6 Sheets-Sheet 2

INVENTOR
J. B. NEWSOM
BY J. W. Schmied
ATTORNEY

INVENTOR
J. B. NEWSOM
BY J W Schmied
ATTORNEY

July 3, 1951 J. B. NEWSOM 2,559,312

CROSSBAR TANDEM OFFICE FOR TELEPHONE SYSTEMS

Filed Nov. 17, 1948 6 Sheets-Sheet 4

INVENTOR
J. B. NEWSOM
BY J. W. Schmied
ATTORNEY

July 3, 1951 J. B. NEWSOM 2,559,312

CROSSBAR TANDEM OFFICE FOR TELEPHONE SYSTEMS

Filed Nov. 17, 1948 6 Sheets-Sheet 5

INVENTOR
J. B. NEWSOM
BY J W Schmied
ATTORNEY

July 3, 1951 J. B. NEWSOM 2,559,312

CROSSBAR TANDEM OFFICE FOR TELEPHONE SYSTEMS

Filed Nov. 17, 1948

6 Sheets-Sheet 6

INVENTOR
J. B. NEWSOM
BY J. W. Schmied
ATTORNEY

Patented July 3, 1951 2,559,312

UNITED STATES PATENT OFFICE 2,559,312

CROSSBAR TANDEM OFFICE FOR TELEPHONE SYSTEMS

James B. Newsom, Great Neck, N. Y., assignor to Bell Telephone Laboratories, Incorporated, New York, N. Y., a corporation of New York Application November 17, 1948, Serial No. 60,503

11 Claims. (Cl. 179—18)

This invention relates to telephone systems, and more particularly, to equipment in a tandem office.

On telephone connections through a cross bar tandem office, a marker in the tandem office controls the establishment of the connection between the tandem trunk and the trunk to the required terminating office or operator's position. The marker receives from the tandem sender the designation of the terminating office or position in the form of a code. This code may be transmitted from the originating office to the tandem sender by means of revertive pulses, dial pulses, or multifrequency pulses. It is the translation function of the marker to convert this code, comprising a combination of two or more code digits, into a circuit path whereby a single route relay, corresponding to this code, may be operated. This route relay may then be suitably wired, by means of cross-connections for example, to direct the marker in the establishment of the connection between the tandem trunk and the terminating office or position.

The marker in a tandem office must be capable of translating not only two- and three-digit office codes, but also may be required to control the establishing of connections to a variety of service positions which are designated by special types of codes.

An object of this invention is to provide a tandem marker capable of receiving from a tandem sender and translating both two-digit and three-digit office codes.

Another object of this invention is to provide a tandem marker capable of receiving from a tandem sender and translating a special type of code known as a service code.

Another object of this invention is to provide a tandem marker capable of receiving from a tandem sender and translating a special service code known as a TX code, functioning to perform that translation whether the TX code be a two-digit or a three-digit code.

In general, these objects have been attained by providing a plurality of groups of relays each serving to perform a translating function whereby the digits registered in the sender are progressively combined until a single route relay, corresponding to those combined digits, is operated to control the establishing of the connection from the tandem trunk to the desired office, service position, or special service position. A pair of relays is also provided one of which is operable when a special service code is registered in the sender, and the other of which is operable under all other conditions, whereby different combinations of groups of relays are used to perform the translations.

These and other features of the invention will be more clearly understood from a consideration of the following description in connection with the accompanying drawings in which.

Where reference is made in the following description to relays or leads with functional designations, the numeral shown in parenthesis following the functional designation is the figure number.

No details of the originating and terminating office or of much of the equipment immediately associated with the tandem senders and marker have been shown. Portions of the tandem senders and portions of the marker not essential to the present disclosure have been omitted for purposes of clarity.

Reference is here made to the tandem telephone system disclosed in Patent 2,281,636, granted May 5, 1942, to W. B. Strickler and to the patents therein referred to for a complete disclosure of a suitable telephone system with which the present invention may be associated. The multifrequency sender depicted and described herein is disclosed in greater detail and claims thereto are presented in the copending application of W. T. Haines and J. B. Newsom, Serial No. 60,502, filed November 17, 1948. Details of the multifrequency pulsing receiving circuit are disclosed in Patent 2,332,912 granted October 26, 1943, to G. Hecht et al.

Figures 1, 4, 8:
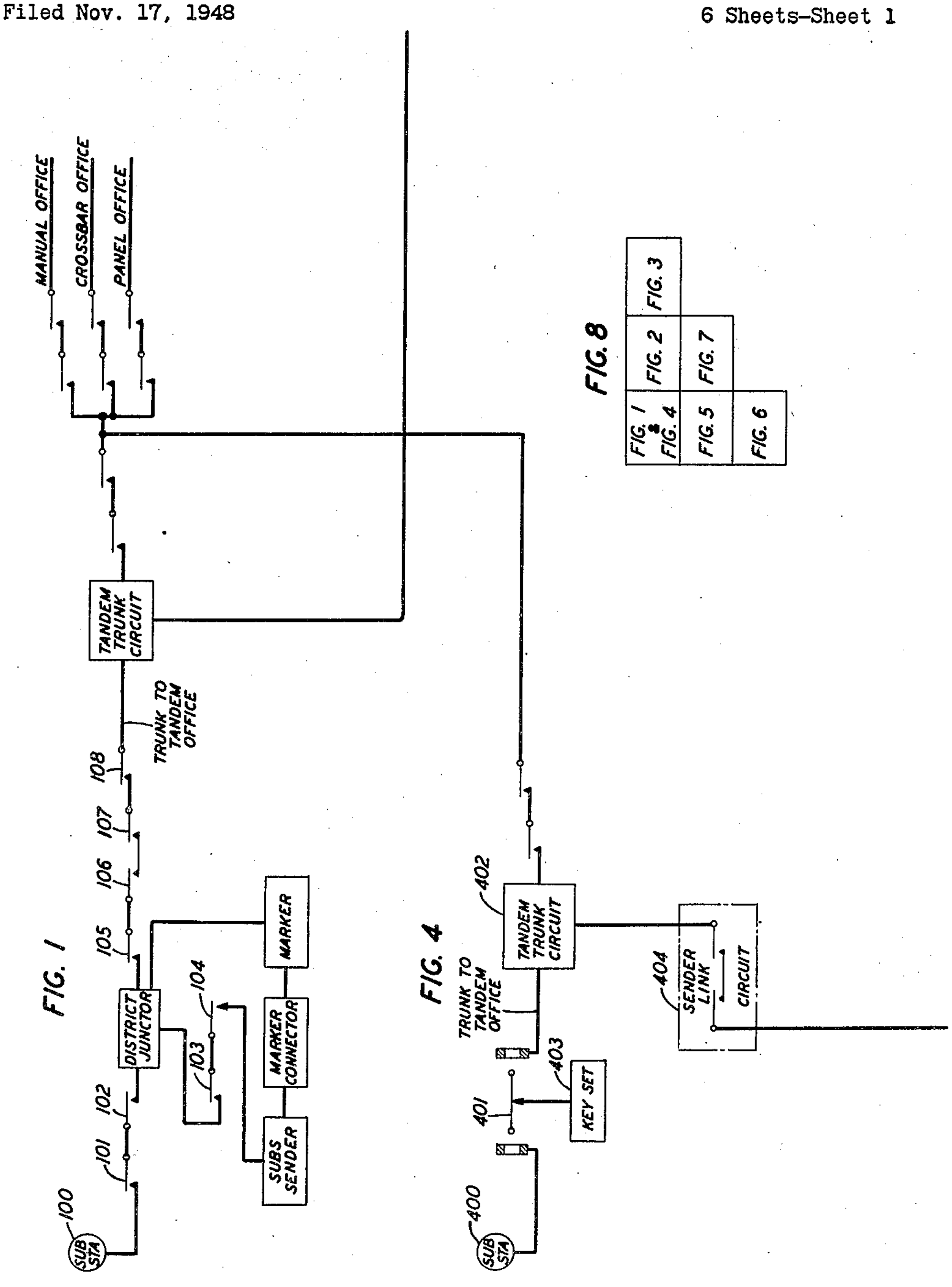
Fig. 1 shows, in diagrammatic form, equipment at an originating office as well as an incoming trunk at a tandem office, to illustrate a connection established by revertive pulsing between the originating office and a revertive pulse tandem sender.
Fig. 4 shows, in diagrammatic form, equipment at an originating office, a tandem trunk circuit, and a sender link circuit, to illustrate a connection established by multifrequency pulsing between the originating office and a multifrequency tandem sender.
Fig. 8 shows the manner of arranging Figs. 1 to 7 inclusive.
Figure 2:
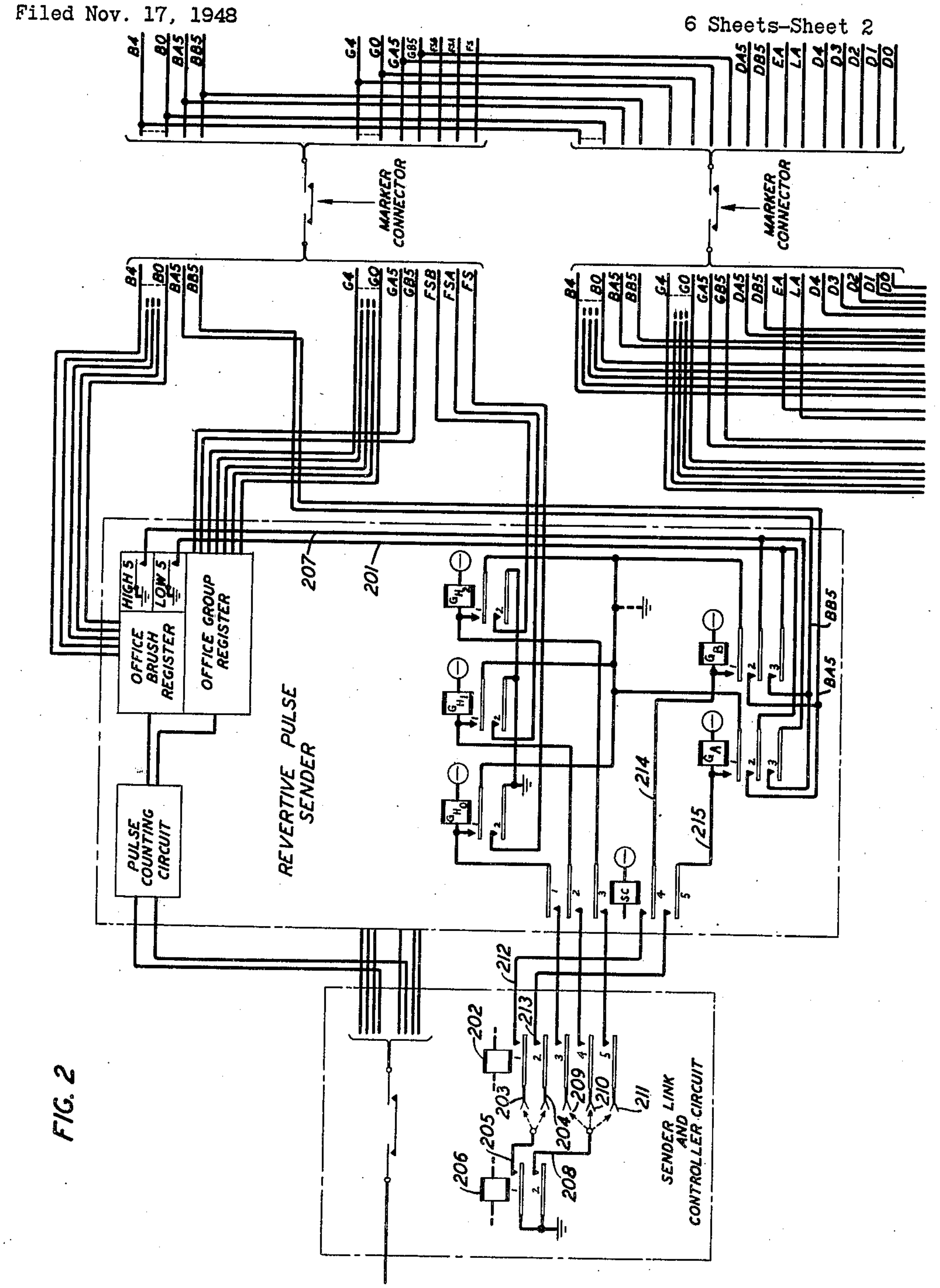
Fig. 2 shows, in diagrammatic form, a sender link and controller circuit, a revertive pulse sender, and marker connectors, detailed circuits being shown only for those features involved in the code translation.
Figure 3:
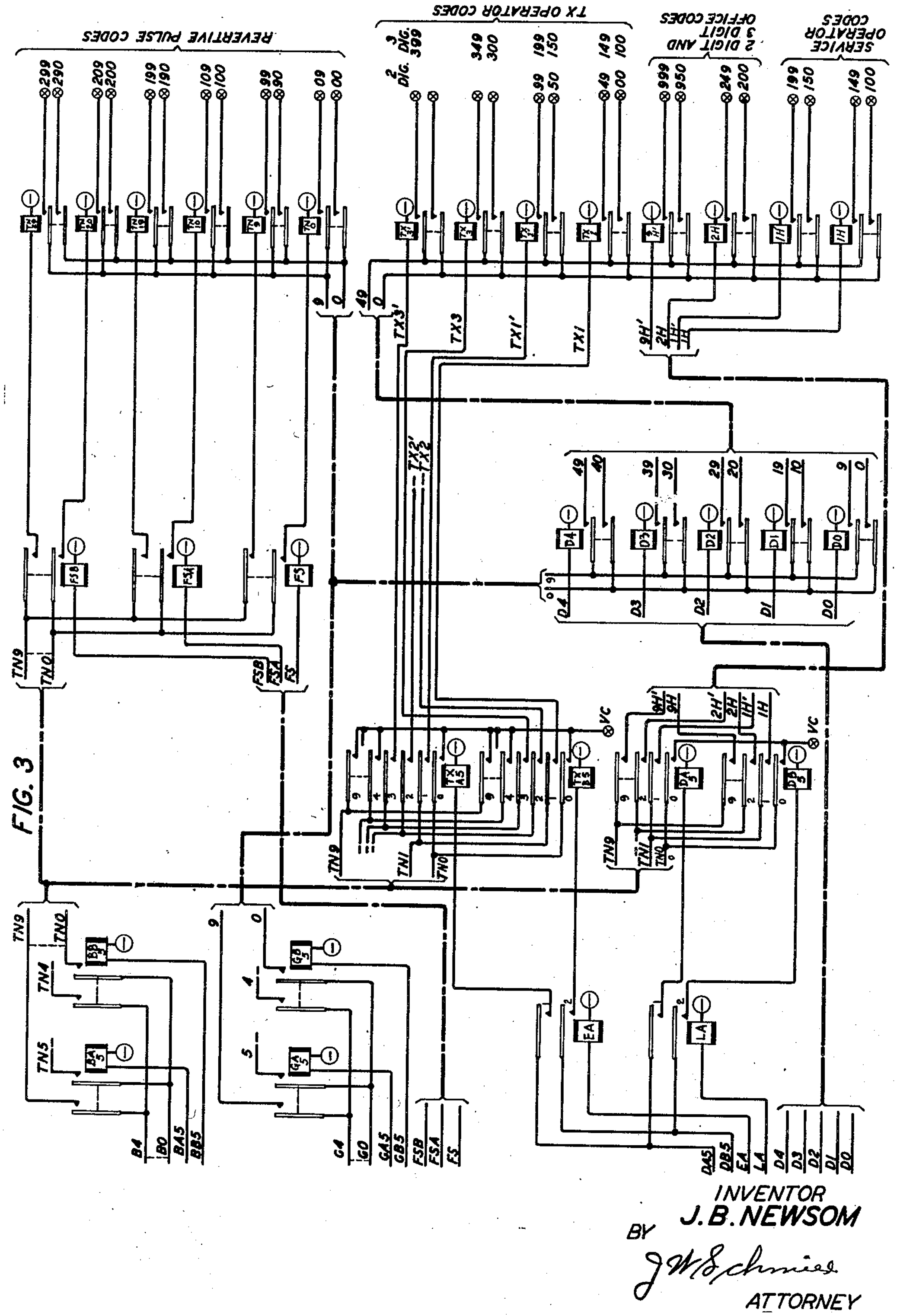
Fig. 3 shows, in diagrammatic form, the code translation features of the marker.

To consider first a tandem connection employing a revertive pulse tandem sender of the type disclosed in the above-cited patent to Strickler as modified by the present disclosure, reference is made to Figs. 1, 2 and 3.

When the subscriber at substation 100 originates a call for a subscriber at an office which may be reached by way of the tandem office, substation 100 is connected by line switches 101 and 102 to a district junctor which, in turn, is connected over sender link switches 103 and 104 with an originating subscriber sender. The subscriber then dials the designation of the wanted line, whereupon the sender connects with a marker through the marker connector and the marker then connects with the district junctor. The sender transmits the office designation to the marker, which translates the designation into the necessary information for selecting an outgoing trunk to the wanted office, in this case a tandem office, and transmits to the sender instructions as to the manner in which the line designation is to be transmitted to that office. After an idle trunk has been seized, switches 105 to 108 are operated by the marker to connect the district junctor with the trunk, and the marker and marker connector are released. The subscriber sender closes a bridge across the tip and ring conductors of the trunk to indicate to the equipment in the tandem office that it is ready to proceed.

The tandem trunk circuit thereupon passes a start signal to the sender link and controller circuit (Fig. 2) which connects the trunk with an idle sender. The sender then receives revertive pulses from the originating subscriber sender, to record the code for the terminating office. This code consists of two revertive pulse selections, namely, office brush and office group selections.

In subscriber senders of early panel switching system offices, there was provision for five office brush selections and ten office group selections, a combination providing for fifty office codes. In senders in cross bar switching system offices, and in later panel office senders, provision is made for ten office brush selections and ten office group selections, a combination providing one hundred office codes. In the tandem sender disclosed herein means are provided to expand the selections provided in the older panel office type sender to one hundred office codes, and further means are provided whereby the one hundred code combinations selectable by either type of sender may be expanded to make available a total of three hundred code combinations to the marker.

In the case of panel office subscriber senders, the office brush selection is registered on the office brush register and the office group selection is registered on the office group register in the tandem sender of Fig. 2. This code information is transmitted through the marker connector (Fig. 2) to the marker (Fig. 3) over the leads B0(2) to B4(2), G0(2) to G4(2), GB5(2) and GA5(2). One of the B0(2) to B4(2) leads is grounded as determined by one of the five office brush selections received. One of the G0(2) to G4(2) leads and the GB5(2) lead are grounded by the corresponding office group selection "0" to "4"; one of the G0(2) to G4(2) leads and the GA5(2) lead are grounded by the corresponding office group selection "5" to "9." Thus the five office brush selections and ten office group selections, in combination, provide for fifty office codes.

In order to obtain fifty additional office codes, two groups of tandem trunks are provided between the originating and tandem office, and provision is made in the tandem sender to connect ground to one or the other of the BB5(2) or BA5(2) leads in combination with the previously mentioned B0(2) to B4(2) leads, depending upon which of the two groups of trunks is seized. For each of these groups of tandem trunks a relay 206 is provided in the sender link and controller circuit. Only one such relay with alternate wiring has been shown in Fig. 2 for purposes of simplicity. At the time the sender link seizes the sender, relay 202 is operated, by means not shown, thereby connecting a plurality of leads through its contacts, among them leads 203 and 204. When one of the relays 206, associated with one of the groups of tandem trunks, operates, ground is connected over a contact of relay 206, conductor 205 to either conductor 203 or 204, through the No. 1 or No. 2 contact of operated relay 202, conductor 212 or 213, No. 4 or No. 5 contact of operated relay SC(2), conductor 214 or 215, winding of relay GB(2) or GA(2) to battery. Thus, when the sender is seized, either relay GB(2) or GA(2) will be operated depending upon which of the two groups of tandem trunks is used. When an office brush selection "0" to "4" is received a "low 5" lead 201 is grounded in addition to one of the B0(2) to B4(2) leads previously mentioned. Lead 201 is multiplied at the contacts of relays GB(2) and GA(2). If relay GA(2) is operated, the ground on lead 201 is conducted through the No. 2 contact of relay GA(2) to lead BA5(2). If relay GB(2) is operated, the ground on lead 201 is conducted through the No. 3 contact of relay GB(2) to lead BB5(2). Thus a total of one hundred code combinations can be transmitted to the marker.

Originating senders in cross bar and in more recent panel offices are able to make ten office brush selections, "0" to "9," and ten office group selections, "0" to "9," thus providing for one hundred code combinations over a single tandem trunk group. In this case an office selection "0" to "4" grounds one of the leads B0(2) to B4(2) and "low 5" lead 201, which, through the No. 3 contact of relay GB(2), grounds lead BB5(2). An office selection "5" to "9" grounds one of the leads B0(2) to B4(2) and "high 5" lead 207 which, through the No. 2 contact of relay GB(2), grounds lead BA5(2). If this trunk group, in subgroups of ten, were connected in the link circuit so as to operate relay GA(2) instead of relay GB(2), then the "low 5" ground on lead 201 would cause the lead BA5(2) to be grounded and the "high 5" ground on lead 207 would cause lead BB5(2) to be grounded, without changing the total number of codes available.

To obtain a maximum of three hundred revertive pulse office codes, by providing additional tandem trunk groups from an originating office, three additional relays GH0(2), GH1(2) and GH2(2) are provided in the sender. One of these relays is operated on a given call, depending upon the subgroup assignment of the sender link of the tandem trunk originating the call, in a manner similar to that already described for the operation of the GA(2) or GB(2) relay. A relay 206 in the sender link controller is associated with each subgroup of ten or less tandem trunks. When one of these relays operates, ground is connected to one of the three leads 209, 210, or 211. This ground will be extended through the No. 3, 4 or 5 contacts of link relay 202 and No. 1, 2 or 3 contacts of sender relay SC(2) to the winding of relay GH0(2), GH1(2) or GH2(2), and to battery. Operation of relay GH0(2), GH1(2) or GH2(2) will connect ground, through its No. 2 contact, to the marker connector on leads, FS(2), FSA(2), or FSB(2), respectively. Thus, these three grounded leads, each one in combination with the one hundred code combinations already described, make available a total of three hundred code combinations to the marker.

Referring to Fig. 3, each of these code combinations, transmitted to the marker through the marker connector, results in the operation of an individual route relay (not shown) in the marker. Ground on lead FS(2), FSA(2) or FSB(2) will cause the operation of relay FS(3), FSA(3) or FSB(3). The operation of one of these three relays will connect the windings of ten relays TN0(3) to TN9(3), TN10(3) to TN19(3), or TN20(3) to TN29(3), respectively, to the TN0(3) to TN9(3) leads from the contacts of relays BB5(3) and BA5(3). One of these two relays BB5(3) or BA5(3), is operated by ground on the corresponding BB5(2) or BA5(2) lead from the marker connector. As above described, one of the B0(2) to B4(2) leads to the contacts of the BB5(3) and BA5(3) relays is also grounded. This ground will therefore operate one of the TN0(3) to TN29(3) relays.

The ten contacts of each of the TN0(3) to TN29(3) relays are multipled through leads 0 to 9 to the contacts on the GB5(3) and GA5(3) relays. One of these relays is operated by ground on lead GB5(2) or GA5(2) from the marker connector and since one of the leads G0(2) to G4(2) is also grounded as previously described, it will be seen that a single ground lead is extended over one of the leads 0 to 9, and through the associated contact on that one of the relays TN0(3) to TN29(3) which is operated, to a single revertive pulse code cross-connection terminal 00 to 299. This terminal is connected to the winding of a route relay the contacts of which are wired or cross-connected in such a way as to direct the marker in establishing the connection between the tandem trunk attached to the tandem sender and the terminating office corresponding to the office code registered in the sender.

To consider a tandem connection employing a multifrequency tandem sender, reference may be made to Figs. 4, 5, 6, 7 and 3. A more detailed discussion of the operation of the multifrequency tandem sender, disclosed in part herein, is contained in the above-cited copending application of W. T. Haines and J. B. Newsom.

Figure 5:
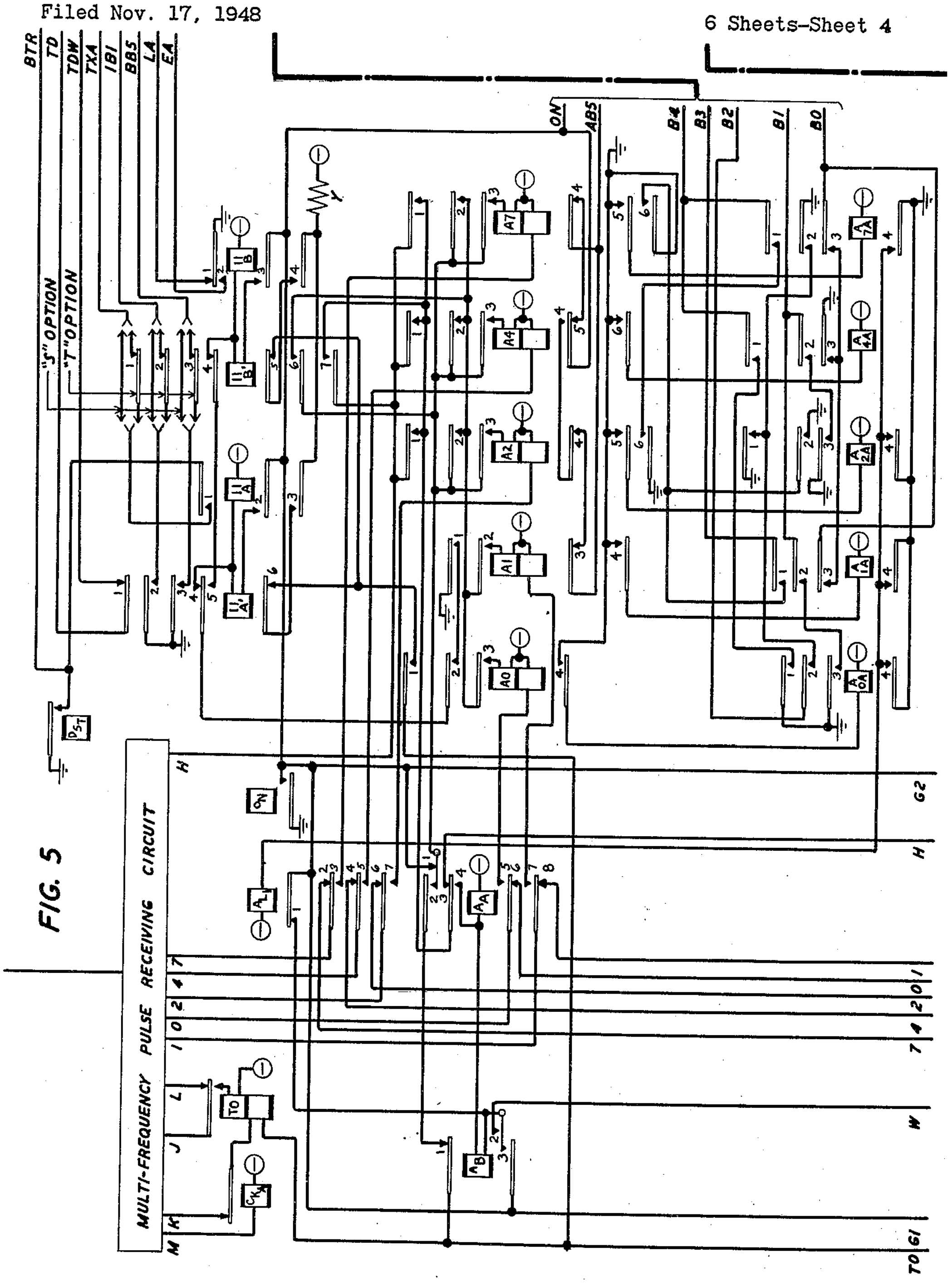
Figs. 5, 6 and 7 show a multifrequency pulse receiving circuit and the multifrequency sender relays concerned in the registering of the office code.
Figure 6:
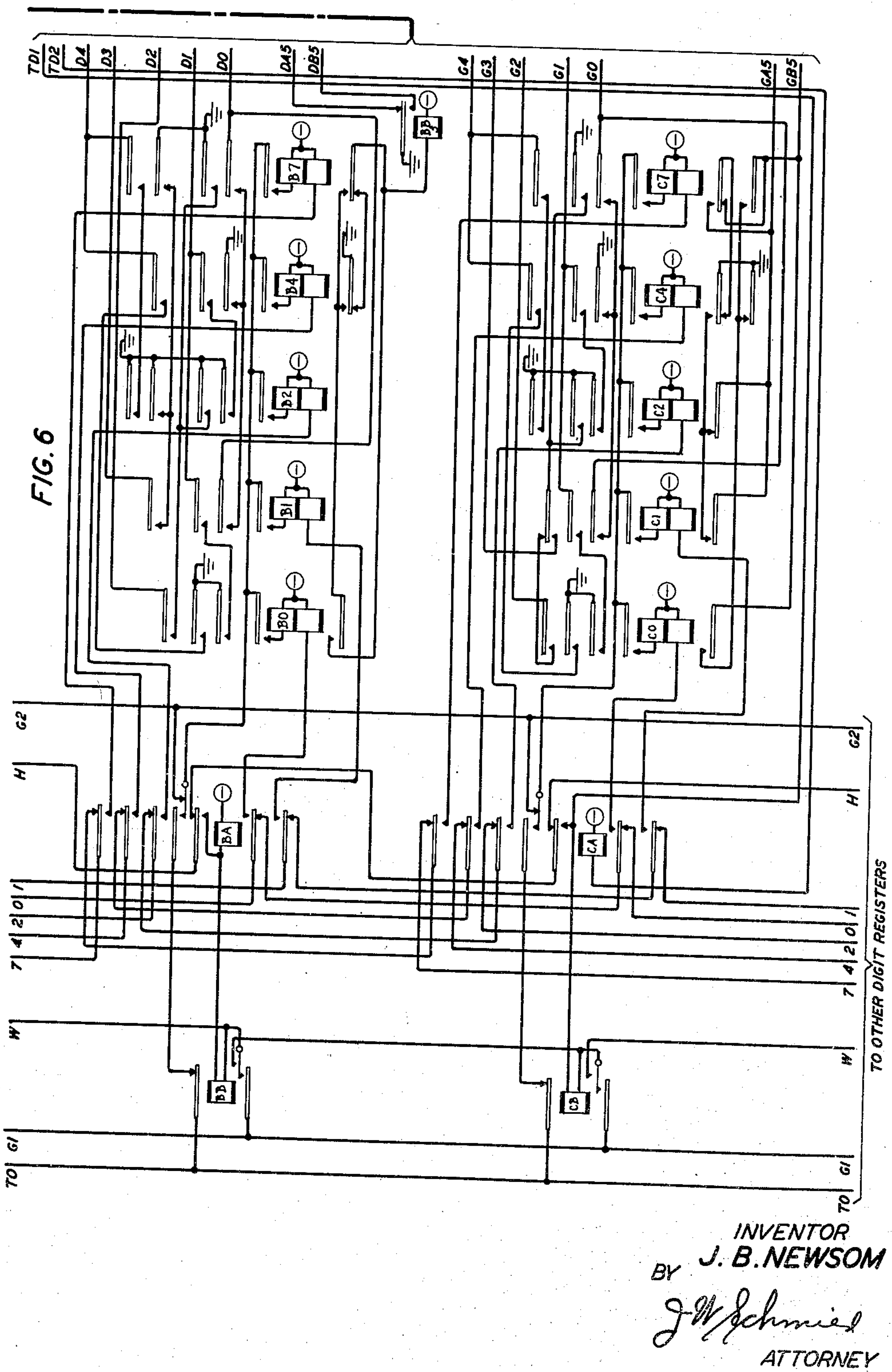
Figure 7:
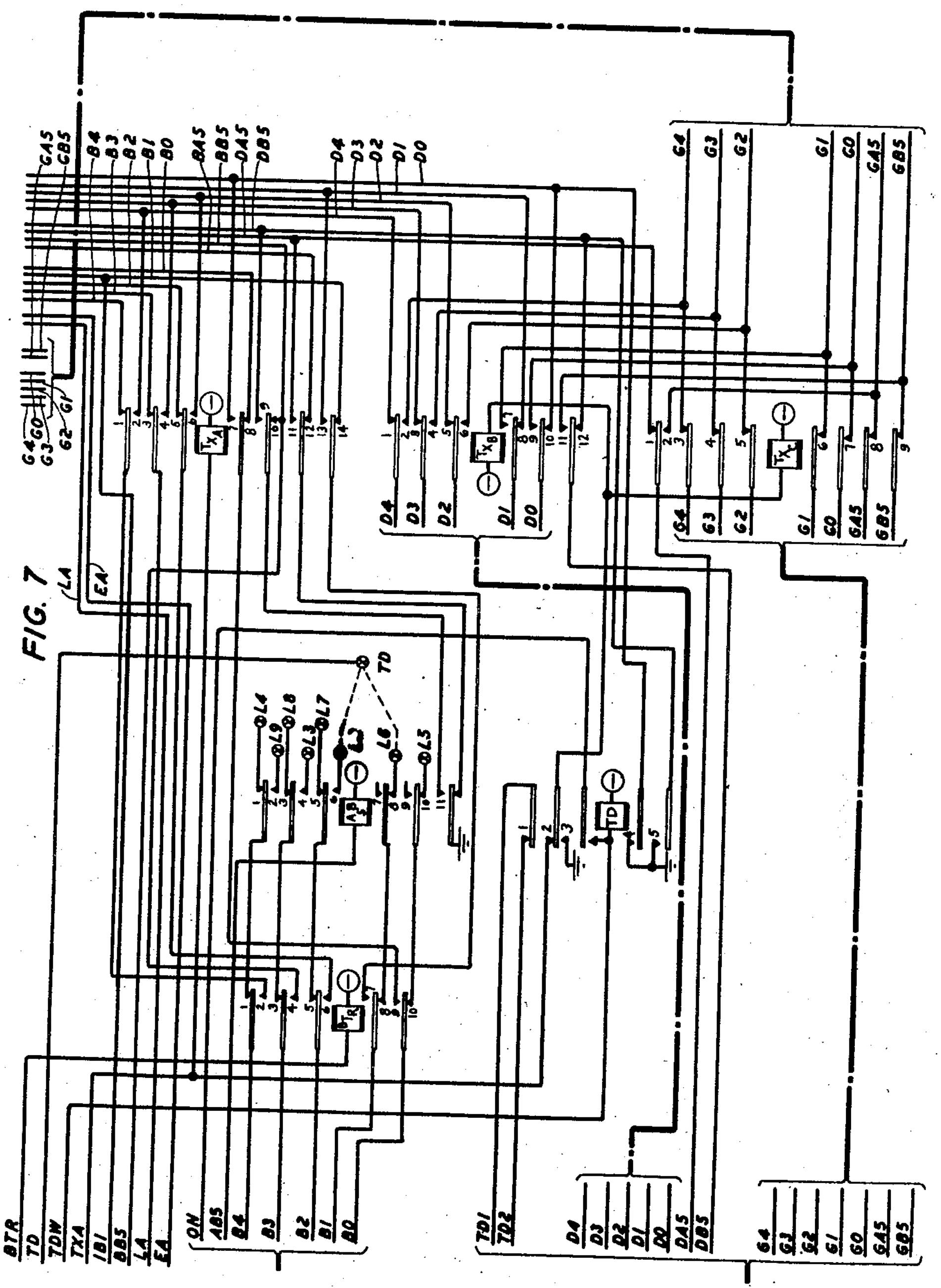

It may be noted that the conductors leading from the revertive pulse sender of Fig. 2 through a marker connector in Fig. 2, and the conductors leading from the multifrequency pulse sender of Figs. 5, 6 and 7 through a marker connector in Fig. 2, are multipled together, respectively, between the marker connector and the marker.

Referring now to Fig. 4, when a calling subscriber at substantion 400 desires to place a call to a subscriber, operator or service position which may be reached by way of the tandem office, subscriber station 400 is connected to a tandem trunk circuit 402 by means of a cord circuit 401 at an operator's position which is provided with a multifrequency pulsing keyset 403.

When the tandem trunk is seized it causes a sender link circuit 404 to connect the tandem trunk to a tandem sender, in this case a multifrequency tandem sender (Figs. 5, 6 and 7), associated with which is a multifrequency pulse receiving circuit which may be of the type disclosed in the above-cited patent to Hecht et al. Detailed circuits are shown only for those parts of the sender concerned with the registration and translation of the office code digits.

The tip and ring leads (not shown) are connected into the sender and the multifrequency receiving circuit, which may be considered to be a part of the sender circuit. The operator at the originating office registers the code designation of the called line by means of the keyset 403. Each digit keyed transmits a pulse of alternating current comprising two frequencies which, through the multifrequency receiving circuit, causes ground to be connected to a pair of the leads 0, 1, 2, 4, 7, from the multifrequency receiving circuit shown in Fig. 5 to the digit-register relays shown in Figs. 5 and 6.

The office codes used in this sender may be either two-digit or three-digit codes or a combination thereof. Two-digit codes comprise all combinations of two digits from 20 to 99, a total of eighty codes. Three-digit codes comprise all combinations of digits from 200 to 999, a total of eight hundred codes. Digits "0" and "1" are not used as the initial or A digit of regular office codes.

*Three-digit office codes*

Consider first the registration of three-digit codes. The first or A digit is registered on two of the A digit-register relays A0(5), A1(5), A2(5), A4(5), and A7(5). The second or B digit is registered on the B-digit register comprising relays B0(6) to B7(6); and the third or C digit is registered on the C-digit register comprising register relays C0(6) to C7(6).

The register relays are operated in pairs for each digit "0" to "9"; the operated relays for each digit being as follows:

| Number Keyed | Receiver Leads Grounded | A Digit Relays | B Digit Relays | C Digit Relays |
|---|---|---|---|---|
| 0 | 4, 7 | A4, A7 | B4, B7 | C4, C7 |
| 1 | 0, 1 | A0, A1 | B0, B1 | C0, C1 |
| 2 | 0, 2 | A0, A2 | B0, B2 | C0, C2 |
| 3 | 1, 2 | A1, A2 | B1, B2 | C1, C2 |
| 4 | 0, 4 | A0, A4 | B0, B4 | C0, C4 |
| 5 | 1, 4 | A1, A4 | B1, B4 | C1, C4 |
| 6 | 2, 4 | A2, A4 | B2, B4 | C2, C4 |
| 7 | 0, 7 | A0, A7 | B0, B7 | C0, C7 |
| 8 | 1, 7 | A1, A7 | B1, B7 | C1, C7 |
| 9 | 2, 7 | A2, A7 | B2, B7 | C2, C7 |

The registration leads from the multifrequency receiving circuit are transferred successively from digit to digit by means of a walking circuit consisting of a pair of relays per digit: relays AA(5) and AB(5) for the A-digit register, relays BA(6) and BB(6) for the B-digit register, and relays CA(6) and CB(6) for the C-digit register. These pairs of relays are all operated before registration starts and are released sequentially as registration proceeds.

The operation of off-normal relay ON(5) (by means not shown) connects ground through the No. 1 contact of unoperated relay AL1(5) to the windings of relays AB(5) and AA(5) in series, and to battery. These relays both operate and lock, through the No. 3 contact of relay AB(5), to ground at the contact of relay ON(5).

Relay AB(5), in operating, closes ground over conductor W(5) to the windings of relays BB(6) and BA(6). These relays operate and in turn extend ground on conductor W(5) to operate relays CB(6) and CA(6).

When the multifrequency receiver, Fig. 5, receives two frequencies corresponding to the first office code digit, it grounds lead H(5) and two of the leads 0 to 7, except the combination 0 and 1, corresponding to the digit "1," which is never used as the first digit of an office code. The initial ground on two leads, leads 1 and 7 for instance, operates the two corresponding register relays in the A-digit register, in this case relays A1(5) and A7(5). Any pair of register relays, except relays A0(5) and A1(5) in combination, will provide a path for the ground on lead H(5) to shunt down relay AB(5), but continue to hold relay AA(5) operated. The holding windings of the two operated relays, any two except A0(5) and A1(5) in combination, are connected in parallel through the No. 2 contact of operated relay AA(5), No. 1 contact of released relay AB(5), primary winding of relay T0(5), back contact of relay CKA(5), to ground on lead K(5) in the multifrequency receiver circuit. Relay CKA(5) was released a few milliseconds following the receipt of the two frequencies by the receiver at the same time the receiver connects ground on the "J-L" loop, which includes a back contact of relay T0(5), to lock the receiver relays operated, even though the multifrequency pulses from the originating end have ceased. Relay T0(5) is a marginal relay which will not operate in series to battery on only one register relay locking winding, but relay T0(5) will operate to battery through the locking windings of two register relays in parallel.

When relay T0(5) operates, it locks to a ground in the multifrequency receiver over lead J(5) and opens lead L(5), which is the locking path for the receiver channel relays. At this time if the multifrequency pulses have ceased, or otherwise when the multifrequency pulses do cease, the receiver channel relays release, which removes ground from lead H(5) and reconnects ground to lead M(5). Removal of ground from lead H(5) releases relay AA(5), which transfers the 0 to 7 leads to the B-digit register relays, B0(6) to B7(6), through front contacts of the previously operated relay BA(5). Lead H(5) is also transferred to the BA(5) relay. The placing of ground on lead M(5) reoperates relay CKA(5).

Registration of subsequent digits on the B and C-digit registers takes place in a similar manner except that no distinction is made for the combined operation of the 0 and 1 relays corresponding to the digit 1; and except that the ground closure on lead H(5) does not depend on the prior operation of one of the register relays, but is applied immediately to shunt down the BB(6) or CB(6) relays simultaneously with the operation of the register relays. The numerical digits following the office code are registered on thousands-, hundreds-, tens-, units-, and stations-digit registers, not shown.

Register relays A0(5), A1(5), A2(5), A4(5) and A7(5) operate auxiliary register relays A0A(5), A1A(5), A2A(5), A4A(5) and A7A(5), respectively, to provide sufficient contacts for later switching operations.

When a three-digit office code is registered on the A-, B- and C-digit registers, relay DST(5) is operated over leads (not shown) from the C-digit register. Relay DST(5), in operating, connects ground over conductor BTR(5) to operate relay BTR(7) and also, by means not shown, causes the marker connector (Fig. 2) to function to connect the leads from the sender register relays into the marker.

Any pair of A-digit register auxiliary relays, A0A(5) to A7A(5), operated to register the digits "0" to "4," connects ground to one of the leads B0(5) to B4(5) through the marker connector (Fig. 2) to the marker (Fig. 3) through the No. 9, No. 7, No. 6, No. 4, or No. 2 contacts of operated relay BTR(7), and the No. 8, No. 14, No. 5, No. 3, or No. 1 contacts of unoperated relay TXA(7). In addition lead BB5(7) to the marker is connected to ground through the No. 10 contact of relay TXA(7) and through the No. 11 contact of relay AB5(7), which is operated when an A-digit less than "5" is registered.

Any pair of A-digit register auxiliary relays, A0A(5) to A7A(5), operated to register digits "5" to "9" also connects ground to one of the leads B0(5) to B4(5) to the marker, but lead BA5(7) is grounded instead of lead BB5(7), since relay AB5(7) is not operated when an A digit "5," or greater, is registered.

Similarly, the digits "0" to "4" registered on the B-digit register, one of the leads D0(6) to D4(6) is grounded, together with lead DB5(6). For any digits "5" to "9," one of the leads D0(6) to D4(6) is grounded together with lead DA5(6).

In like manner, for the C-digit register, one of the leads G0(6) to G4(6) is grounded, together with either lead GB5(6) or GA5(6) depending on whether the digit is less than "5," or "5" or greater.

Lead LA(5) to the marker is grounded on all regular office codes by ground at the No. 1 contact of relay 11B(5) which operates only on so-called TX codes to be described hereinafter.

In the marker, Fig. 3, the ground on lead LA(5) is conducted through the winding of relay LA(3) to battery. Relay LA(3), in operating, closes ground from grounded lead DB5(6) or DA5(6) through the No. 2 or No. 1 contacts of relay LA(3) to operate relay DB5(3) or DA5(3). The ground placed on lead BB5(5) or BA5(5) in the sender is conducted to the marker through the marker connector to operate relay BB5(3) or relay BA5(3). With either relay BB5(3) or relay BA5(3) operated, and with ground on one of the leads B0(5) to B4(5), ground will be placed on one of the leads TN0(3) to TN9(3) in accordance with the digit registered in the A-digit register in the sender. This ground on one of the leads TN0(3) to TN9(3) is conducted to the contacts of relays DB5(3) and DA5(3) in multiple. If relay DB5(3) is operated, the ground is conducted through one of the contacts of that relay to the corresponding lead 2H(3) to 9H(3) to operate one of the 2H(3) to 9H(3) relays. If relay DA5(3) is operated, the ground is conducted through one of the contacts of that relay to the corresponding lead 2H'(3) to 9H'(3) to operate one of the 2H'(3) to 9H'(3) relays. It may be noted that the connections for lead TN0(3) at the contacts of relays DB5(3) and DA5(3) are connected to terminal "VC" to which the "vacane code" route relay is connected, since the digit "0" is never used as the first digit of an office code. The connections for lead TN1(3) at the contacts of relays DB5(3) and DA5(3) are utilized in the case of service codes to be hereinafter described.

The ground in the sender on one of the leads D0(6) to D4(6) is conducted through the marker connector to operate the corresponding relay D0(3) to D4(3).

The ground placed on lead GB5(6) or GA5(6)

in the sender is conducted to the marker to operate relay GB5(3) or GA5(3). With one of these relays operated, and with ground on one of the leads G0(6) to G4(6), ground will be placed on one of the leads 0 to 9 in accordance with the digit registered in the C-digit register in the sender. This ground is conducted to the contacts of relays D0(3) to D4(3) in multiple. That ground will then be conducted through the associated one of the ten contacts of the operated relay D0(3) to D4(3), over one of the leads 0 to 49 and to the contacts of relays 2H(3) to 9H'(3) in multiple. Each of the relays 2H(3) to 9H'(3) is provided with 50 contacts. Therefore, the ground on one of the leads 0 to 49 is conducted through the associated contact of that one of the relays 2H(3) to 9H'(3) which is operated, and is then conducted to one of the office code terminals 200 to 299. Each of these terminals is connected to the winding of an individual route relay which is arranged to direct the marker in establishing the connection between the tandem trunk associated with the tandem sender and the terminating office corresponding to the office code registered in the sender.

In this manner the 800 possible office codes in the sender, using the digits "2" to "9" for the A-digit any any digit "0" to "9" for the B and C-digits may be connected to operate an independent route relay in the marker. For example, assume that the office code is 259. Then the sender will ground leads B2(5), BB5(5), D0(6), DA5(6), G4(6), GA5(6) and LA(5). In this case, ground on lead B2(5) through contacts of operated relay BB5(3) and operated relay DA5(3) will operate relay 2H'(3), which controls code points 250 to 299. Ground on lead G4(6) through contacts of operated relays GA5(3) and D9(3) will be connected to the associated contact of the 2H'(3) relay, which is connected to the terminal corresponding to the code 259.

*Two-digit office codes*

Consider now the registration of two-digit office codes by the multifrequency sender shown in Figs. 5, 6 and 7. Any A-digit "2" to "9" may be used as a two-digit office code index. For such initial digit or digits, the corresponding cross-connection terminals L2(7) to L9(7) are connected to terminal TD(7). When a two-digit index is registered on the A-digit register, Fig. 5, ground from the auxiliary A-digit register relays, A0A(5) to A7A(5), is conducted over one of the leads B0(5) to B4(5) through one of the back contacts of unoperated relay BTR(7) and through either a back or front contact of relay AB5(7) to the cross-connection terminal TD(7). Terminal TD(7) is connected over lead TD(7) through the No. 1 contact of relay 11A'(5), over conductor TDW(5) to the winding of relay TD(7), which operates and locks to off-normal ground. Relay AB5(7) is preoperated by off-normal ground supplied through the contact of operated relay ON(5). Since this operating path is under the control of the A-digit register relays, relay AB5(7) remains operated if the A digit registered is "0" to "4," but is released if the A digit is "5" to "9." Relay AB5(7) is fast releasing so that it will be released, if it is going to release, before the operating ground for relay TD(7) is supplied by the operation of the auxiliary A-digit register relays A0A(5) to A7A(5).

The B digit of a two-digit office code is registered on the B-digit register; but the operation of relay TD(7) breaks, at its No. 1 contact, the locking path for the CA(6) and CB(6) walking relays, and the release of these relays results in the effective bypassing of the C-digit register so that the next or thousands digit will be properly registered in the thousands digit register. The remaining numerical digits are registered in their corresponding registers.

Thus both two-digit and three-digit office codes may be used. If all A digits are cross-connected for two-digit codes by connecting all terminals L2(7) to L9(7) to the TD(7) terminal, then relay TD(7) is operated on all office codes and only two-digit codes are used, namely, "20" to "99," a total of 80 codes.

Relay TD(7) in operating, closes a circuit through its No. 3 contact to operate relays TXB(7) and TXC(7). Leads D0(6) to D4(6) and DB5(6), from the B-digit register relays, Fig. 6, are transferred by the operation of relay TXB(7) so that these leads are disassociated from leads D0(7) to D4(7) and DB5(7), and are connected to leads G0(7) to G4(7) and GB5(7), respectively, to the marker connector. Operation of relay TXC(7) disassociates leads G0(6) to G4(6), GA5(6) and GB5(6) from leads G0(7) to G4(7), GA5(7) and GB5(7), and transfers lead DA5(6) from lead DA5(7) to lead GA5(7). The operation of relay TD(7) connects, at its Nos. 4 and 5 contacts, ground to leads D0(7) and DB5(7), which is the equivalent of the registration of the digit "0" on the B-digit register. Thus a two-digit code, "25" for example, is transmitted as code "205" to the marker. Therefore, a two-digit office code is translated in the marker in the same fashion as is a three-digit office code except that only those office code route relay terminals 200 to 999, associated with relays 2H(3) to 9H'(3), which have "0" as their middle digit are available for two-digit codes, i. e. "200" to "209," "300" to "309," etc.

*Service codes*

Service codes are those used by toll operators to obtain special connections such as to the toll information board, to the toll test board, to route and directory positions, etc. Service codes are generally of the form DX in which D may be any digit except "1," and X any digit "0" to "9," and are distinguished from other codes by the fact that they are always prefixed by a certain preselected digit, herein presumed to be the digit "1."

When a service code, "100" to "109," or "120" to "199," is received, the initial digit "1" is registered by the operation of the counting relays 11A(5) and 11A'(5), and the two digits of the service code proper are registered on the A- and B-digit registers. When the digit "1" is received by the sender as an initial or "A" digit, the receiver grounds leads 0(5) and 1(5) to operate the A0(5) and A1(5) register relays. With these two relays operated, a ground is connected from the No. 1 contact of relay A1(5), No. 2 contact of relay A0(5), No. 4 contact of unoperated relay 11A'(5), winding of relay 11A(5) to battery, thereby operating relay 11A(5). The multifrequency receiver connects ground to lead H(5) as usual, but this lead is not connected through contacts of either relays A0(5) to A1(5) to advance the walking circuit by shunting down the AB(5) relay.

Battery through resistance Y(5), equivalent to two register relay locking windings in parallel, is connected through the No. 3 contact of operated relay 11A(5), No. 6 contact of unoperated relay 11A'(5), No. 1 contact of relay A0(5), winding of relay T0(5) contact of relay CKA(5), to ground on lead K(5) in the multifrequency receiver, and relay T0(5) operates. The operation of relay T0(5) allows the channel relays in the multifrequency receiver to release, and they release relays A0(5) and A1(5). This permits relay 11A'(5) to operate over a path from ground at the contact of off-normal ground relay ON(5), No. 2 contact of relay 11A(5), windings of relay 11A'(5) and 11A(5) in series, to battery. These two relays thus lock operated in series to ground over the No. 2 contact of relay ON(5).

The second digit received, or the first digit of the service code proper, may be any digit except the digit "1." The registration of this digit is retained on the A-digit register relays, and the walking circuit is advanced so that the third received digit will be registered on the B-digit register. As is apparent from the circuit, this difference in operation is a result of the fact that the ground on lead H(5) is closed through in all cases except in the operation of the A0(5) and A1(5) relays in combination, and no locking path is provided for these two relays when they are operated together.

Relay 11A'(5), in operating, connects ground, at its Nos. 2 and 3 contacts, to leads 1B1(5) and BB5(5) which are extended as leads B1(7) and BB5(7) to the marker connector, and represent the digit "1." When the third received digit is registered, relay DST(5) operates, through a path not shown, and causes the marker connector to connect the sender with an idle marker. With relays DST(5) and 11A(5) operated, ground is connected from the contact of relay DST(5), through the No. 1 contact of relay 11A(5) to lead TXA(5) to operate relay TXA(7), and through the No. 2 contact of unoperated relay TD(7) to operate relays TXB(7) and TXC(7).

The operation of relay TXA(7) causes leads B0(5) to B4(5), from the A-digit register and through the contacts of operated relay BTR(7), to be disassociated from the B-series leads to the marker connector upon the opening of the Nos. 8, 14, 5, 3 and 1 contacts of relay TXA(7), and to be connected to the D-series leads to the marker connector upon the closure of the Nos. 7, 13, 6, 4, and 2 contacts of relay TXA(7). Similarly, operation of relay TXB(7) and TXC(7) causes the B-digit register leads D0(6) to D4(6), DA5(6) and DB5(6) to be connected to the G-series leads to the marker connector and disconnects the C-digit register leads G0(6) to G4(6), GA5(6) and GB5(6) at the Nos. 7, 6, 5, 4, 3, 8, and 9 contacts of relay TXC(7). Thus, in transmitting the service code designation to the marker, the initial digit "1" is transmitted over the B-series leads normally associated with A-digit register, the next digit, which is registered on the A-digit register, is transmitted over the D-series leads normally associated with the B-digit register, and the last digit of the service code, which is registered on the B-digit register, is transmitted over the G-series leads normally associated with the C-digit register. In other words a two-digit service code prefixed by the digit "1" is transmitted to the marker, Fig. 3, as a three-digit code having "1" as an initial digit.

In the marker, Fig. 3, the ground on lead DB5(7) or DA5(7), resulting from the registration in the sender A-digit register of a digit less than "5" or "5" or greater, respectively, is conducted through the No. 2 or No. 1 contact of operated relay LA(3) to operate either relay DB5(3) or relay DA5(3). Relay BB5(3) is operated by the ground on lead BB5(7). The ground on lead B1(7) is then conducted through the associated contact of operated relay BB5(3) to lead TN1(3) over which it is conducted to the associated contacts of relays DB5(3) and DA5(3), in multiple. If relay DB5(3) has been operated, the ground will be conducted over lead 1H(3) to operate relay 1H(3). If relay DA5(3) has been operated, the ground will be conducted over lead 1H'(3) to operate relay 1H'(3).

The ground on one of the leads D0(7) to D4(7), depending on the digit registered in the sender A-digit register, serves to operate one of the relays D0(3) to D4(3). Relay GB5(3) or GA5(3) is operated from the ground placed on lead GB5(7) or GA5(7) depending on whether a number less than "5" or "5" or greater was registered in the sender B-digit register. Then the ground on one of the leads G0(7) to G4(7) will be conducted through the associated contact of operated relay GB5(3) or GA5(3), over one of the leads 0 to 9, through the associated contact of that one of the series of relays D0(3) to D4(3) which is operated, over one of the leads 0 to 49, over the associated contact of operated relay 1H(3) or 1H'(3) to the proper one of the service operator code terminals 100 to 199 to operate the selected route relay. For example, if a service code "49" prefixed by digit "1," is received at the sender, the digit "1" will be registered on relays 11A(5) and 11A'(5) and leads BB5(7) and B1(7) will be grounded. The digit "4" will be registered on A-digit register relays A0(5) and A4(5) resulting in the subsequent grounding of leads DB5(7) and D4(7). The digit "9" will be registered on the B-digit register relays B2(6) and B7(6), resulting in the subsequent grounding of leads GA5(7) and G4(7). Therefore, in the marker, relays LA(3), BB5(3), DB5(3), and GA5(3) will be operated. The ground on lead B1(7) will be condcted through the associated contact of operated relay BB5(3), over conductor TN1(3), through the associated contact of operated relay DB5(3), over conductor 1H(3) to operate relay 1H(3). Ground on lead D4(7) will operate relay D4(3). The ground on lead G4(7) will be conducted through the associated contact of operated relay GA5(3), over conductor 9, through the associated contact of operated relay D4(3), over conductor 49, through the associated contact of operated relay 1H(3), to service operator code terminal 149.

*Special service codes*

Special service codes, herein also referred to as TX codes, may be either two-digit or three-digit codes prefixed by the digits "11," i. e., "11EX" or "11EXX" codes, where "X" represents any digit from "0" to "9," and "E" represents any digit except "0."

TX codes are used principally in the completion of delayed toll calls. In the case, for instance, of a person-to-person call in which the called party is unavailable, the operator may ask that the called party be requested to call the toll or long distance operator at the city where the call has originated, and designate this operator by the name of the city and a number, two-digit or three-digit as the case may be. When the called party later asks his own operator to connect him with the toll operator "EX" or "EXX" in the distant city, his operator will dial or key the digits "11EX" or "11EXX" over a toll line. This will connect the toll line to the operator position or team in the originating office, who will then complete the call to the original calling subscriber.

Certain TX codes are used for special purposes such as establishing toll conference connections, connections to charge quotation operators, and so on.

When a TX code preceded by the digits "11" is received, the two successive digits "1" are registered on the 11A(5), 11A'(5), 11B(5), and 11B'(5) counting relays. The following two or three digits of the TX code proper are registered on the A- and B-, or on the A-, B- and C-digit registers, respectively.

The first received digit "1" is registered on relays 11A(5) and 11A'(5) as above described. The second received digit "1" operates relays A0(5) and A1(5) as before. Operation of these relays closes a path from ground at the No. 1 contact of relay A1(5), No. 2 contact of relay A0(5), No. 5 contact of operated relay 11A'(5), No. 4 contact of relay 11B'(5), winding of relay 11B(5), to battery. The consequent operation of relay 11B(5) results in the connection of battery through resistance Y(5), through the No. 4 contact of relay 11B(5), No. 5 contact of unoperated relay 11B'(5) No. 1 contact of relay A0(5), winding of relay T0(5), contact of relay CKA(5), to lead K(5) which is grounded in the multifrequency receiver. Relay T0(5), in operating, releases relays A0(5) and A1(5), as described hereinbefore. The release of relays A0(5) and A1(5) disables the shunting path around the winding of relay 11B'(5), and relay 11B'(5) thereby operates over a path from battery, winding of relay 11B(5), winding of relay 11B'(5), No. 3 contact of relay 11B(5), to ground at the contact of relay ON(5). Relay 11B'(5), in operating, closes, through its No. 7 contact, lead H(5) to the winding of relay AA(5) independently of which of the A-digit register relays is operated, and thereby also prepares a shunting path around the winding of relay AB(5). Relay 11B'(5), in operating, also provides an independent path for the locking windings of A-digit register relays A0(5) and A1(5). Therefore, the next digit to be received, which will be the first digit of the TX code proper, will be registered and locked on the A-digit register even if it be the digit "1," and the walking circuit will be advanced. The register circuits of the sender operate in the normal fashion thereafter, registering the second digit of the TX code proper on the B-digit register and, if three-digit TX codes are used, registering the third digit of the TX code proper on the C-digit register.

In the case of two-digit TX codes, the resulting transmission to the marker is similar to that in the case of two-digit service codes; in the case of three-digit TX codes, the resulting transmission to the marker is similar to that in the case of three-digit office codes. Therefore, means must be provided to enable the marker to distinguish TX codes from other types of codes. This is accomplished upon the operation of relay 11B(5) when the second digit "1," prefixing a TX code, is received. Relay 11B(5), in operating, breaks, at its No. 1 contact, the previously existing connection between ground and lead LA(5), and establishes, at its No. 2 contact, a connection from ground to lead EA(5). Ground on lead LA(5) indicates to the marker that an office or service code is being transmitted from the sender, and ground on lead EA(5) indicates that a TX code is being transmitted.

Although the use of either two-digit or three-digit TX codes is contemplated, it may be noted that in the present disclosure no provision is made for the combined use of these two types of TX codes. When three-digit TX codes are used, the "T" option wiring at relay 11B'(5) is used, and when two-digit TX codes are used, the "S" option wiring is used. It may be noted that the "S" option wiring comprises the placing of shunts around the circuits through the Nos. 1, 2 and 3 contacts of relay 11B'(5). Since relay 11B'(5) is unoperated except in the registration of TX codes, whether "S" or "T" option wiring is used is immaterial in the registration of office or service codes. For two-digit TX codes, the use of the "S" option shunts around the contacts of relay 11B'(5) causes the circuits to operate in the same fashion as that described for service codes. Since the Nos. 1, 2 and 3 contacts of relay 11B'(5) are shunted, the operation of relay 11B'(5) is ineffective to break the circuits through these contacts, ground is placed on leads 1B1(5) and BB5(5) and relays TXA(7), TXB(7) and TXC(7) are operated as before described. Therefore, the digit "1" is transmited over the B-series leads, the first digit of the TX code proper, which is registered on the A-digit register, is transmitted over the D-series leads, and the second digit of the TX code proper, which is registered on the B-digit register, is transmitted over the G-series leads to the marker. In the marker, Fig. 3, the ground on lead EA(5) will serve to operate relay EA(3). The ground on lead DB5(7) or DA5(7) will be conducted through the No. 2 or No. 1 contact of relay EA(3) to operate relay TXB5(3) or TXA5(3). The ground on lead BB5(7) serves to operate relay BB5(3). The ground on lead B1(7) is conducted through the associated contact on operated relay BB5(3), over conductor TN1(3), through the associated contact of that one of the relays TXB5(3) or TXA5(3) which is operated, over lead TX1(3) or TX1'(3), to operate relay TX1(3) or TX1'(3).

The ground on one of the leads D0(7) to D4(7), depending on the value of the digit registered in the sender A-digit register, serves to operate the associated one of the relays D0(3) to D4(3). The ground on lead GA5(7) or GB5(7) serves to operate relay GA5(3) or GB5(3). The ground on one of the leads G0(7) to G4(7), depending on the value of the digit registered in the sender B-digit register, is conducted through the associated contact of operated relay GB5(3) or GBA(3), over one of the conductors 0 to 9, through the associated contact of that one of the D0(3) to D4(3) relays which is operated, over one of the leads 0 to 49, through the associated contact of operated relay TX1(3) or TX1'(3) to the associated TX operator code terminal 00 to 99, which is connected to a route relay.

For example, if two-digit TX codes are used and the code "38" prefixed by the digits "11" is received, registration of those digits in the multifrequency sender will result in ground being placed on leads EA(5), BB5(7), B1(7), DB5(7), D3(7), GA5(7), and G3(7). Relays EA(3), TXB5(3), BB5(3), and GA5(3) will be operated. The ground on lead B1(7) will be conducted through the associated contact of relay BB5(3), over lead TN1(3) through the associated contact of relay TXB5(3), over lead TX1(3), to operate relay TX1(3). The ground on lead D3(7) will operate relay D3(3). The ground on lead G3(7) will be conducted through the associated contact of relay GA5(3), over lead 8, through the associated contact of operated relay D3(3), over lead 38, through the associated contact of operated relay TX1(3) to the TX operator code terminal 38.

For three-digit TX codes "T" option wiring is used at the 11B'(5) relay. Therefore with relay 11B'(5) operated, the previously traced energizing circuits for relays TXA(7), TXB(7) and TXC(7) are interrupted at the No. 1 contact of relay 11B'(5). Thus the leads from the A-, B- and C-digit registers are connected to the marker B-series, D-series and G-series leads, respectively, in the same fashion as for regular office codes, and, therefore, a three-digit TX code is transmitted to the marker in the same manner as is a three-digit office code. The above discussed grounding of the EA(5) lead again serves as a means for the marker to distinguish TX codes from office or service codes.

In the marker, Fig. 3, the ground on lead EA(5) will serve to operate relay EA(3). The ground on lead DB5(5) or DA5(7), depending on whether the digit registered in the sender B-digit register is less than "5" or "5" or greater, will be conducted through the No. 2 or No. 1 contact of relay EA(3) to operate relay TXB5(3) or TXA5(3). The ground on lead BB5(7) or BA5(7), depending on whether the digit registered in the sender A-digit register is less than "5" or "5" or greater, will operate relay BB5(3) or BA5(3). The ground on one of the leads B0(7) to B4(7) is conducted through the associated contact on operated relay BB5(3) or BA5(3), over one of the conductors TN0(3) to TN9(3), through the associated contact of that one of the relays TXB5(3) or TXA5(3) which is operated, over one of the leads TX1(3) to TX3'(3), to operate the associated one of the relays TX1(3) to TX3'(3). The ground on one of the leads D0(7) to D4(7), depending on the value of the digit registered in the sender B-digit register, serves to operate the associated one of the relays D0(3) to D4(3). The ground on lead GB5(7) or GA5(7) serves to operate relay GB5(3) or GA5(3). The ground on one of the leads G0(7) to G4(7), depending on the value of the digit registered in the sender C-digit register, is conducted through the associated contact of operated relay GB5(3) or GA5(3), over one of the conductors 0 to 9, through the associated contact of that one of the D0(3) to D4(3) relays which is operated, over one of the leads 0 to 49, through the associated contact of that one of the relays TX1(3) to TX3'(3) which is operated, to the associated TX operator code terminal 100 to 399, which is connected to a route relay. Thus, the three-digit special service or TX code has been translated into a circuit path whereby a single route relay corresponding to this code may be operated to control the extension of the connection between the tandem trunk and the desired special service position.

The above description of the invention is purely illustrative, and the association of the invention with the disclosed cooperating equipment is but representative and is not to be interpreted in a limiting sense.

What is claimed is:

1. In a telephone system, an originating office, a tandem office, switching equipment at each of said offices, a trunk extending between said originating office and said tandem office, a plurality of service positions connectable to said trunk through the switching equipment at said tandem office, a sender in said tandem office associable with said trunk for registering the designation of any of said service positions, and a marker in said tandem office responsive to the code digits registered in said sender for controlling the extension of a connection from said trunk to the designated one of said service positions, said marker comprising first means responsive to the registration in said sender of a service code, and second means operable in response to said first means for translating the service code digits registered in said sender and for transmitting an indication for actuating means to control the extension of said connection.

2. In a telephone system, an originating office, a tandem office, a plurality of terminating offices, switching equipment at each of said offices, a trunk extending between said originating office and said tandem office, a plurality of special service positions connectable to said trunk through the switching equipment at said tandem office, a sender in said tandem office associable with said trunk for registering the designation of any of said terminating offices or of any of said special service positions, and a marker in said tandem office responsive to the code digits registered in said sender for controlling the extension of a connection from said trunk to the designated one of said terminating offices or of said special service positions, said marker comprising first means selectively operable in response to the registration in said sender of an office code or a special service code, and second means selectively operable in response to said first means for translating the code digits registered in said sender and for transmitting an indication for actuating means to control the extension of a connection to either a terminating office or to a special service position.

3. In a telephone system, an originating office, a tandem office, switching equipment at each of said offices, a trunk extending between said originating office and said tandem office, a plurality of service positions connectable to said trunk through the switching equipment at said tandem office, a sender in said tandem office associable with said trunk for registering the designation of any of said service positions, and a marker in said tandem office responsive to the code digits registered in said sender for controlling the extension of a connection from said trunk to the designated one of said service positions, said marker comprising first means for translating an indication of the registration in said sender of a certain digit prefixing said service code digits and an indication of the value of the first service code digit and for transmitting an indication thereof, second means for translating an indication of the value of the first service code digit and an indication of the value of the second service code digit and for transmitting an indication thereof, and means for translating the indications transmitted by said first and said second means and for transmitting an indication for actuating means to control the extension of said connection.

4. In a telephone system, an originating office, a tandem office, switching equipment at each of said offices, a trunk extending between said originating office and said tandem office, a plurality of service positions connectable to said trunk through the switching equipment at said tandem office, a sender in said tandem office associable with said trunk for registering the designation of any of said service positions, and a marker in said tandem office responsive to the code digits registered in said sender for controlling the extension of a connection from said trunk to the designated one of said service positions, said marker comprising first means selectively operable in response to the value of the first of the service code digits for translating an indication of the registration in said sender of a certain initial digit preceding said service code and for transmitting an indication thereof, second means selectively operable in response to the value of the first and of said service code digits for translating an indication of the value of the second of said service code digits and for transmitting an indication thereof, and means selectively operable in response to the indication transmitted by said first means for translating the indication transmitted by said second means and for transmitting an indication for actuating means to control the extension of said connection.

5. In a telephone system, an originating office, a tandem office, switching equipment at each of said offices, a trunk extending between said originating office and said tandem office, a plurality of service positions connectable to said trunk through the switching equipment at said tandem office, a sender in said tandem office associable with said trunk for registering the designation of any of said service positions, and a marker in said tandem office responsive to the code digits registered in said sender for controlling the extension of a connection from said trunk to the designated one of said service positions, said marker comprising first means responsive to the registration of a service code in said sender, second means responsive to the registration in said sender of a certain initial digit preceding said service code for transmitting an indication of said certain digit, third means selectively operable in response to the operation of said first means and to the value of the first service code digit for translating said indication from said second means and for transmitting an indication thereof, fourth means responsive to the value of the second of said service code digits for transmitting an indication thereof, fifth means selectively operable in response to the value of the first of said service code digits for translating said indication from said fourth means and for transmitting an indication thereof, sixth means responsive to the indication transmitted by said third means for translating the indication transmitted by said fifth means and for transmitting an indication thereof, and means actuated by said indication transmitted by said sixth means for controlling the extension of said connection.

6. In a telephone system, an originating office, a tandem office, switching equipment at each of said offices, a plurality of trunks extending between said originating office and said tandem office, a plurality of service positions connectable to said trunks through the switching equipment at said tandem office, each of said positions being designated by a two-digit service code prefixed by a preselected digit, a sender in said tandem office associable with any of said trunks for registering the designation of any of said service positions, and a marker in said tandem office responsive to the code digits registered in said sender for controlling the extension of a connection from one of said trunks to the designated one of said service positions, said marker comprising first means responsive to the registration of a service code in said sender, second means responsive to the registration in said sender of said preselected digit prefixing said service code and for transmitting an indication thereof, third means operable in response to the operation of said first means and to the registration in said sender of a first service code digit greater or less than a preselected value for translating the indication transmitted by said second means and for transmitting an indication thereof, fourth means responsive to the value of the second service code digit registered in said sender to transmit an indication thereof, fifth means for translating an indication of the value of the first service code digit and said indication transmitted by said fourth means and for transmitting an indication of the combination of said first and said second service code digits, sixth means for translating the indications transmitted by said third means and said fifth means and for transmitting an indication of the combination of said first and said second service code digits and said preselected digit prefixing said service code digits, and means responsive to the indication transmitted by said sixth means for controlling the extension of said connection.

7. In a telephone system, an originating office, a tandem office, switching equipment at each of said offices, a trunk extending between said originating office and said tandem office, a plurality of special service positions connectable to said trunk through the switching equipment at said tandem office, a sender in said tandem office associable with said trunk for registering the designation of any of said special service positions, and a marker in said tandem office responsive to the code digits registered in said sender for controlling the extension of a connection from said trunk to the designated one of said special service positions, said marker comprising first means responsive to the registration in said sender of a special service code, and second means operable in response to said first means for translating the special service code digits registered in said sender and transmitting an indication for actuating means to control the extension of said connection.

8. In a telephone system, an originating office, a tandem office, switching equipment at each of said offices, a trunk extending between said originating office and said tandem office, a plulrality of special service positions connectable to said trunk through the switching equipment at said tandem office, a sender in said tandem office associable with said trunk for registering the designation of any of said special service positions, and a marker in said tandem office responsive to the code digits registered in said sender for controlling the extension of a connection from said trunk to the designated one of said special service positions, said marker comprising first means responsive to the registration in said sender of a special service code, second means operable in response to said first means for translating an indication of the registration in said sender of a certain digit prefixing said special service code digits and an indication of the value of the first special service code digit and for transmitting an indication thereof, third means for translating an indication of the value of the first special service code digit and an indication of the value of the second special service code digit and for transmitting an indication thereof, and means for translating the indications transmitted by said second and said third means and for transmitting an indication for actuating means to control the extension of said connection.

9. In a telephone system, an originating office, a tandem office, switching equipment at each of said offices, a trunk extending between said originating and said tandem offices, a plurality of special service positions connectable to said trunk through the switching equipment at said tandem office, each of said positions being designated by a two-digit special service code prefixed by two preselected digits, a sender in said tandem office associable with any of said trunks for registering the designation of any of said special service positions, and a marker in said tandem office responsive to the code digits registered in said sender for controlling the extension of a connection from said trunk to the designated one of said special service positions, said marker comprising first means responsive to the registration in said sender of the two preselected digits prefixing a special service code, second means responsive to the registration in said sender of the preselected digits prefixing a special service code for transmitting an indication thereof, third means selectively operable in response to the operation of said first means and to the value of the first of the special service code digits for translating said indication from said second means and for transmitting an indication thereof, fourth means responsive to the value of the second of said special service code digits for transmitting an indication thereof, fifth means selectively operable in response to the value of the first of said special service code digits for translating said indication from said fourth means and for transmitting an indication thereof, sixth means responsive to the indication transmitted by said third means for translating the indication transmitted by said fifth means and for transmitting an indication thereof, and means actuated by said indication transmitted by said sixth means for controlling the extension of said connection.

10. In a telephone system, an originating office, a tandem office, switching equipment at each of said offices, a trunk extending between said originating office and said tandem office, a plurality of special service positions connectable to said trunk through the switching equipment at said tandem office, a sender in said tandem office associable with said trunk for registering the designation of any of said special service positions, and a marker in said tandem office responsive to the code digits registered in said sender for controlling the extension of the connection from said trunk to the designated one of said special service positions, said marker comprising first means responsive to the registration in said sender of a special service code, second means operable in response to said first means for translating an indication of the value of the first digit of said special service code and an indication of the value of the second digit of said special service code and for transmitting an indication thereof, third means for translating an indication of the value of the second digit of said special service code and an indication of the value of the third digit of said special code and for transmitting an indication thereof, and means for translating the indications transmitted by said second means and said third means and for transmitting an indication for actuating means to control the extension of said connection.

11. In a telephone system, an originating office, a tandem office, switching equipment at each of said offices, a trunk extending between said originating office and said tandem office, a plurality of special service positions connectable to said trunk through the switching equipment at said tandem office, each of said positions being designated by a three-digit special service code prefixed by two preselected digits, a sender in said tandem office associable with said trunk for registering the designation of any of said special service positions, and a marker in said tandem office responsive to the code digits registered in said sender for controlling the extension of a connection from said trunk to the designated one of said special service positions, said marker comprising first means responsive to the registration in said sender of the two preselected digits prefixing a special service code, second means operable in response to the value of the first of said special service code digits for transmitting an indication thereof, third means selectively operable in response to the registration in said sender of a second special service code digit greater or less than a preselected value and in response to said first means for translating the indication transmitted by said second means and for transmitting an indication thereof, fourth means for translating an indication of the value of the second of said special service code digits and an indication of the value of the third of said special service code digits and for transmitting an indication thereof, and means for translating the indications transmitted by said third means and said fourth means and for transmitting an indication for actuating means to control the extension of said connection.

JAMES B. NEWSOM.

REFERENCES CITED

The following references are of record in the file of this patent:

UNITED STATES PATENTS

| Number | Name | Date |
|---|---|---|
| 2,262,947 | Korn | Nov. 18, 1941 |